US012034728B2

(12) United States Patent
He et al.

(10) Patent No.: US 12,034,728 B2
(45) Date of Patent: Jul. 9, 2024

(54) DYNAMIC ACCESS CONTROL IN SERVICE MESH WITH SERVICE BROKER

(71) Applicant: EMC IP Holding Company LLC, Hopkinton, MA (US)

(72) Inventors: Xuebin He, Westwood, MA (US);
Victor Fong, Medford, MA (US);
Kenneth Durazzo, Morgan Hill, CA (US); Edgardo Robles, Franklin, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 283 days.

(21) Appl. No.: 17/383,657

(22) Filed: Jul. 23, 2021

(65) Prior Publication Data

US 2023/0027507 A1    Jan. 26, 2023

(51) Int. Cl.
H04L 29/06 (2006.01)
H04L 9/40 (2022.01)
H04L 29/08 (2006.01)
H04L 67/02 (2022.01)
H04L 67/51 (2022.01)

(52) U.S. Cl.
CPC .......... *H04L 63/101* (2013.01); *H04L 63/083* (2013.01); *H04L 63/105* (2013.01); *H04L 67/02* (2013.01); *H04L 67/51* (2022.05)

(58) Field of Classification Search
CPC ..... H04L 67/02; H04L 63/0807; H04L 63/10; H04L 67/562; H04L 63/101; H04L 63/083; H04L 63/105; H04L 67/51

USPC .......................................................... 726/4
See application file for complete search history.

(56) References Cited

U.S. PATENT DOCUMENTS

| 7,733,822 | B2 * | 6/2010 | Gidwani | H04W 12/06 370/328 |
| 7,954,144 | B1 * | 5/2011 | Ebrahimi | H04L 67/02 709/227 |
| 8,229,812 | B2 * | 7/2012 | Raleigh | H04L 41/0894 709/219 |
| 9,026,079 | B2 * | 5/2015 | Raleigh | H04L 67/306 455/406 |
| 9,769,207 | B2 * | 9/2017 | Raleigh | H04W 12/12 |
| 10,158,610 | B2 * | 12/2018 | Cooper | H04L 63/08 |
| 11,494,482 | B1 * | 11/2022 | Mital | H04L 63/0884 |

OTHER PUBLICATIONS

Attribute-Based Access Control in Service Mesh, Yu et al, Nov. 2019 (Year: 2019).*

* cited by examiner

*Primary Examiner* — Jahangir Kabir
(74) *Attorney, Agent, or Firm* — Workman Nydegger (57) ABSTRACT

One example method includes performing dynamic access control in a computing network. A computing environment is configured such that an application can access a service without specifying secrets. The secrets needed to access the service are obtained and stored in a credential store. The secrets can be obtained using the service mesh in a manner that isolates the application from the secrets.

6 Claims, 9 Drawing Sheets

DYNAMIC ACCESS CONTROL IN SERVICE MESH WITH SERVICE BROKER

FIELD OF THE INVENTION

Embodiments of the present invention generally relate to access control and access control operations. More particularly, at least some embodiments of the invention relate to systems, hardware, software, computer-readable media, and methods for performing dynamic access control operations in a service mesh.

BACKGROUND

Many applications are constructed to user services and there is, as a result, a need to communicate with various services. For example, an online retail application may have a component that allows a user to browse products. This application, however, may need to know whether a particular product is actually in stock. Thus, the retail application may need to communicate with a service such as a database that stores inventory information.

Rather than coding the online application directly to communicate with the database, a service mesh is often used. A service mesh allows some aspects of the application related to communication between services, to be abstracted to the infrastructure. More specifically, a service mesh can take the details of how a request gets from the retail application to the database out of the retail application's logic. This function is abstracted to an infrastructure layer—the service mesh. Without a service mesh, each application (e.g., microservice) would include logic to control service-to-service communication. This clearly complicates application development.

Even though a service mesh provides various advantages, conventional service meshes have trouble handling situations where secrets (e.g., credentials) are required. For example, in order to use third-party services, code must be added to an application such that secrets can be handled. For example, the application must be configured to read the secrets from environment variables, configuration files, or command line arguments.

This code complicates the development of the application, prolongs the development cycle, and forces the developer to learn details about the third-party service. For example, an authentication mechanism may differ based on service provider—even for the same service type. A database service from Azure, for example may have different authentication mechanisms than database services from other providers.

Further, current methods for using services, including third-party services, include storing the secrets by the application. For example, Kubernetes implements a service catalog, which is an example of a service broker. In this example, the service catalog may request the secrets and the secrets may be stored in an API server (a server that allows applications to each other). If any of the components are compromised, the secrets may be exposed in this environment.

Another problem facing developers is the need to compare third-party services for cost or performance. This is typically done by the developer and requires time. Further, each time the services changes, the developer may be required to invest more time researching the cost and performance of the third-party services.

In addition, application programming interfaces (APIs) and services are being updated more frequently. Applications that use these APIs and services are therefore required to react to these changes. This can impact the cost of development and maintenance.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to dynamic access control. More particularly, at least some embodiments of the invention relate to systems, hardware, software, computer-readable media, and methods for controlling access and secrets in a service mesh with a service broker.

Embodiments of the invention allow authentication operations including dynamic access control to be abstracted to the service mesh. Embodiments of the invention improve service meshes and service brokers such that services, including third-party services, can be consumed without requiring applications to include code to read the configurations required by the third-party services and without requiring applications to handle the associated secrets. As used herein, secrets may refer to various types of credentials and tokens (e.g., username/password, access token). This advantageously allows developers to spend more time on developing the application itself.

Without embodiments of the invention, a common approach to credentials and service consumption is to place the credentials into user-space containers as environment variables. However, this requires the application to be configured to handle the credentials and thus presents a security risk should the user-space container be compromised. Embodiments of the invention reduce the risk of attack by isolating the secrets from containers executing in user space.

Thus, even if a user space container is compromised, the vulnerability does not expand to other containers, services, or platforms.

Figure 1A:
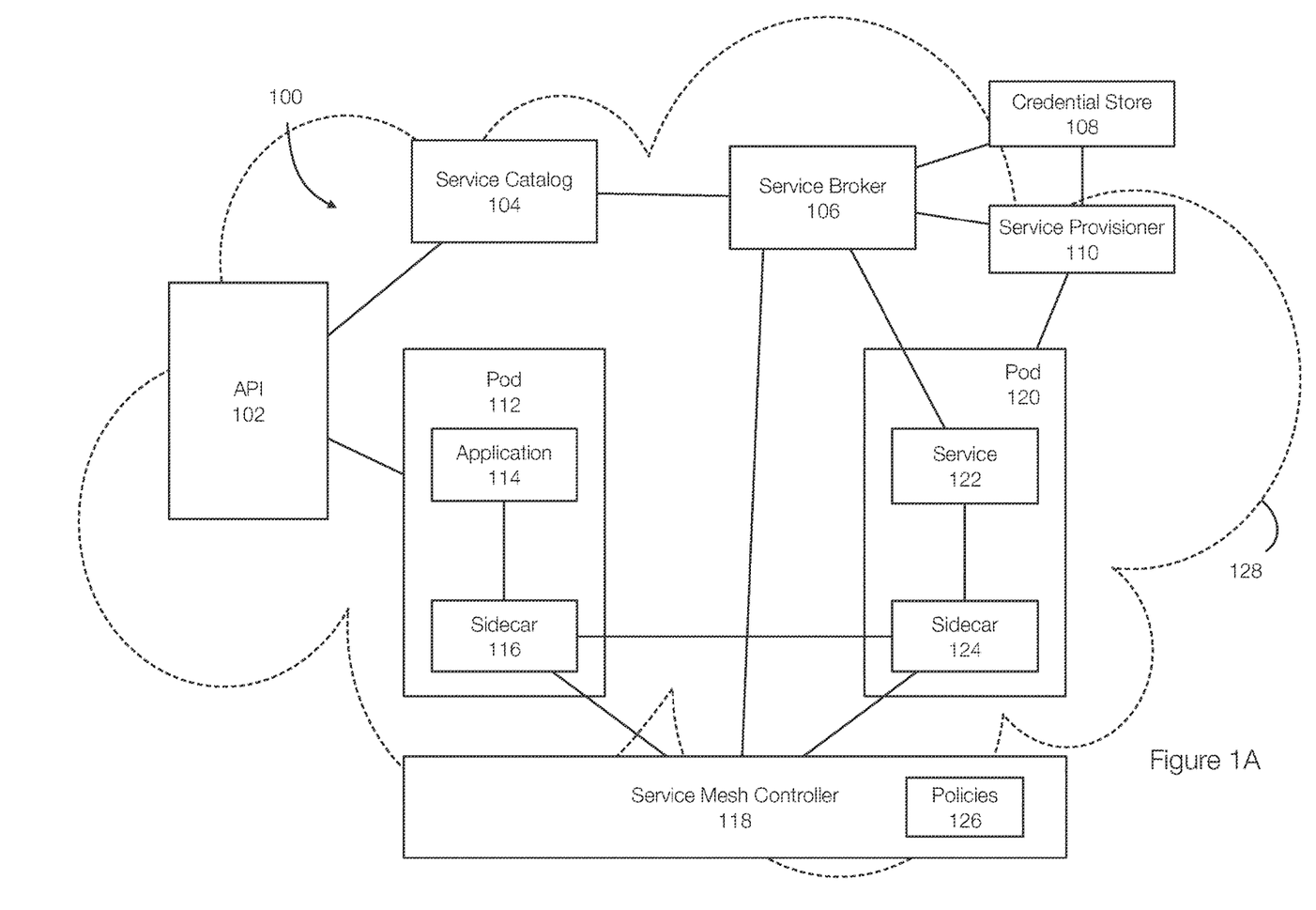
FIG. 1A discloses aspects of a computing environment that is configured to perform dynamic access control and allow applications to access services without directly providing credentials.

FIG. 1A illustrates an example of a computing environment configured to perform dynamic access control operations. While FIG. 1A is discussed with reference to Kubernetes, embodiments are not limited thereto and may be implemented in other environments including containerized environments or environments that implement a service mesh and/or service brokers.

The environment 100 includes an API 102 (e.g., Kubernetes API). In one example, the API 102 may be an API server that functions as a control plane. Users may access a cluster through the API 102 and allows users, external components, and components of the cluster to communicate with each other.

The environment 100, which may be an example of a cluster, includes a service mesh 98 and a service mesh controller 118. The service mesh 128 allows different parts (e.g., components or services) of an application to share data or communicate. In one example, the service mesh 128 includes network proxies (e.g., a sidecar) that can be controlled by a service mesh controller 118 and policies 126. The policies 126 may define how services or applications communicate with each other and external systems. Without the service mesh 128, the applications would need to be configured to control communications (e.g., application to service or service to service).

The environment may also include a service catalog 104 and a service broker 106. In one example, the service catalog 104 is an intermediary between the API 102 and the service broker 106. Using the service catalog 104, services offered by or accessible through a service broker 106 can be browsed. Thus, the service catalog 104 allows an application to provision and connect to services such as databases, queues, messaging, and the like.

The service mesh 128 may be combined with the service broker 106 to secure the connection between an application and services. The service mesh 128, for example, may use the mTLS (Mutual Transport Layer Security) to ensure that the application 114 can only access the services that have provisioned and bound to the application 114. Thus, a service such as the service 122 can only be accessed by subscribed applications. In embodiments of the invention, secrets are not passing between components that could lead to a security issue. Without embodiments of the invention, the service mesh configuration of each container is developer configured. This may lead to misconfigurations and errors and is a potential source of security issues.

In contrast, by integrating the service mesh controller 118 with the service broker 106 as in embodiments of the invention, the connection of each container is automatically configured such that each container or application can only access destinations or services configured in the service mesh 128 by the service broker 106.

Embodiments further perform token management in the service mesh traffic. This secures third-party services even in the context of scaling applications, services, or the platform itself. Embodiments of the invention allow authentication and connection mechanisms to be performed outside of user space, which reduces security risks.

The authentication and connection mechanisms disclosed herein in the context of a service broker and a service mesh allow developers to be further de-coupled from cloud service providers. By isolating secrets, containers running in user-space are further separated from the administrator space.

FIG. 1A thus discloses aspects of dynamic access control using a service mesh in a containerized platform. The ability to provide dynamic access control includes several components that are included in or added to the platform 100. FIG. 1 illustrates a sidecar 124 that has been customized according to embodiments of the invention. Thus, the sidecar 124 is both similar to and distinct from the sidecar 116.

In one example, the sidecars 116 and 124 may be proxy servers that are configured to redirect traffic based on policies 126 defined in and maintained by a service mesh controller 118. The sidecar 116 and 124, for example, may handle application layer traffic in protocols such as HTTP. The sidecar 124, however, is customized and is deployed along with a service 122, which is an example of a third-party service.

The sidecar 124 is further configured to listen for all requests for the service 122, translate the original application layer request, and establish a secure connection with the service 122. For example, if the service 122 is a database service (e.g., MongoDB), the sidecar 124 may receive an SQL query that is secured by TLS. The sidecar 124 may receive the SQL query and send the same SQL query to the service 122 secured by secrets. This allows the sidecar 124 to be involved in the secrets associated with the service 122.

The service mesh controller 118 is also configured in accordance with embodiments of the invention. In this example, the service mesh controller 118 injects the sidecar 116 into the pod 112 where a container (e.g., the application 114) is created. Network policies for services across the service mesh are controlled through the sidecar 116. The service mesh controller 118 may also inject the sidecar 124 into the pod 120 of the service 122, which may be a third-party service.

The service broker 106 is also customized in embodiments of the invention. The service broker 106 is a middleman between the service requesters and the service providers (e.g., following Open Service Broker API). The service broker 106 can send a request to the service provisioner 110 to provision a dedicated or shared third-party service. The service broker 106 advantageously has an endpoint for authentication for applications including applications that have bond services. This allows the service broker 106 to participate in secret handling and secret related operations.

Figure 1B:
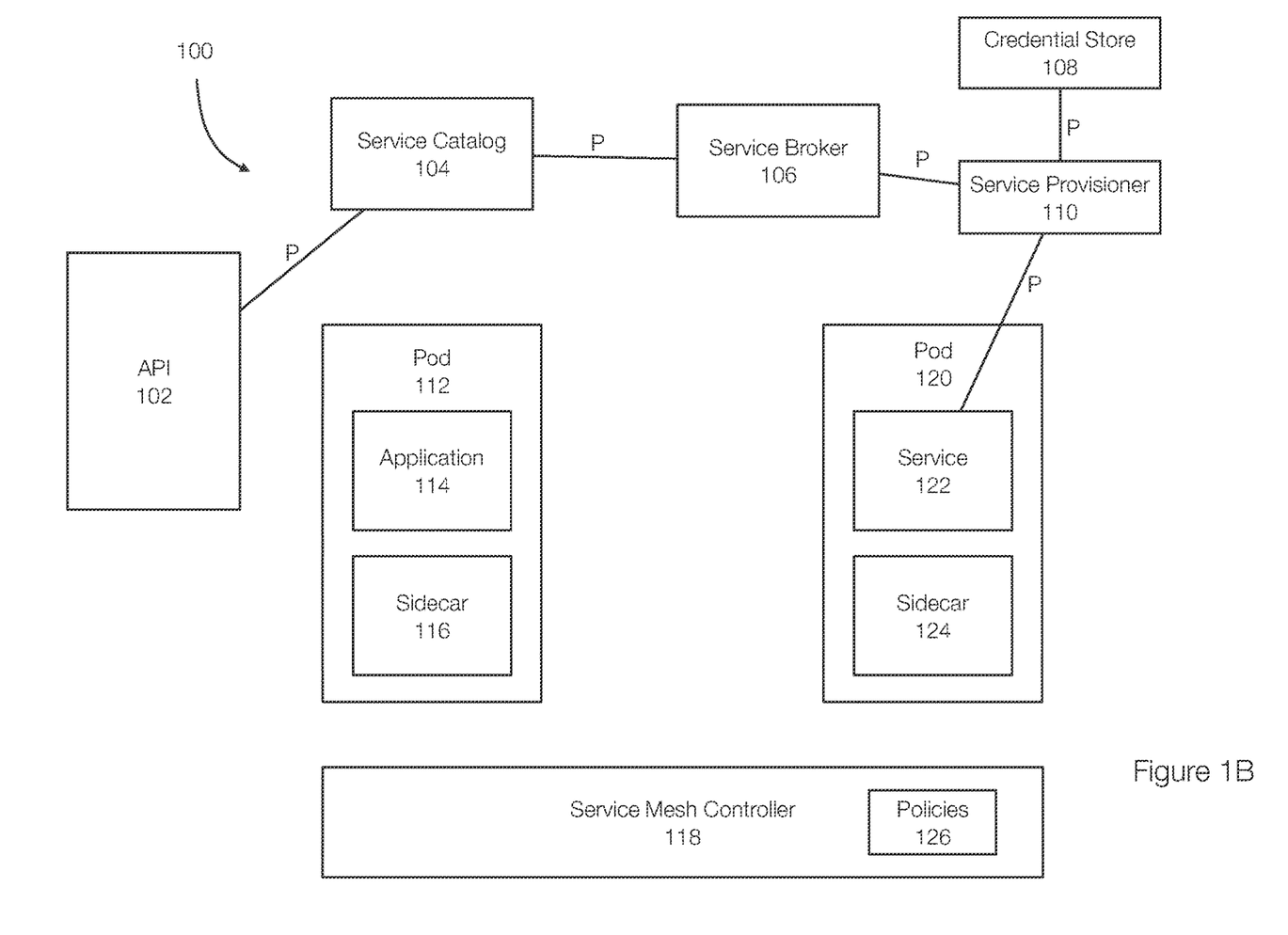
FIG. 1B discloses aspects of provisioning a services in the environment of FIG. 1A.
Figure 1C:
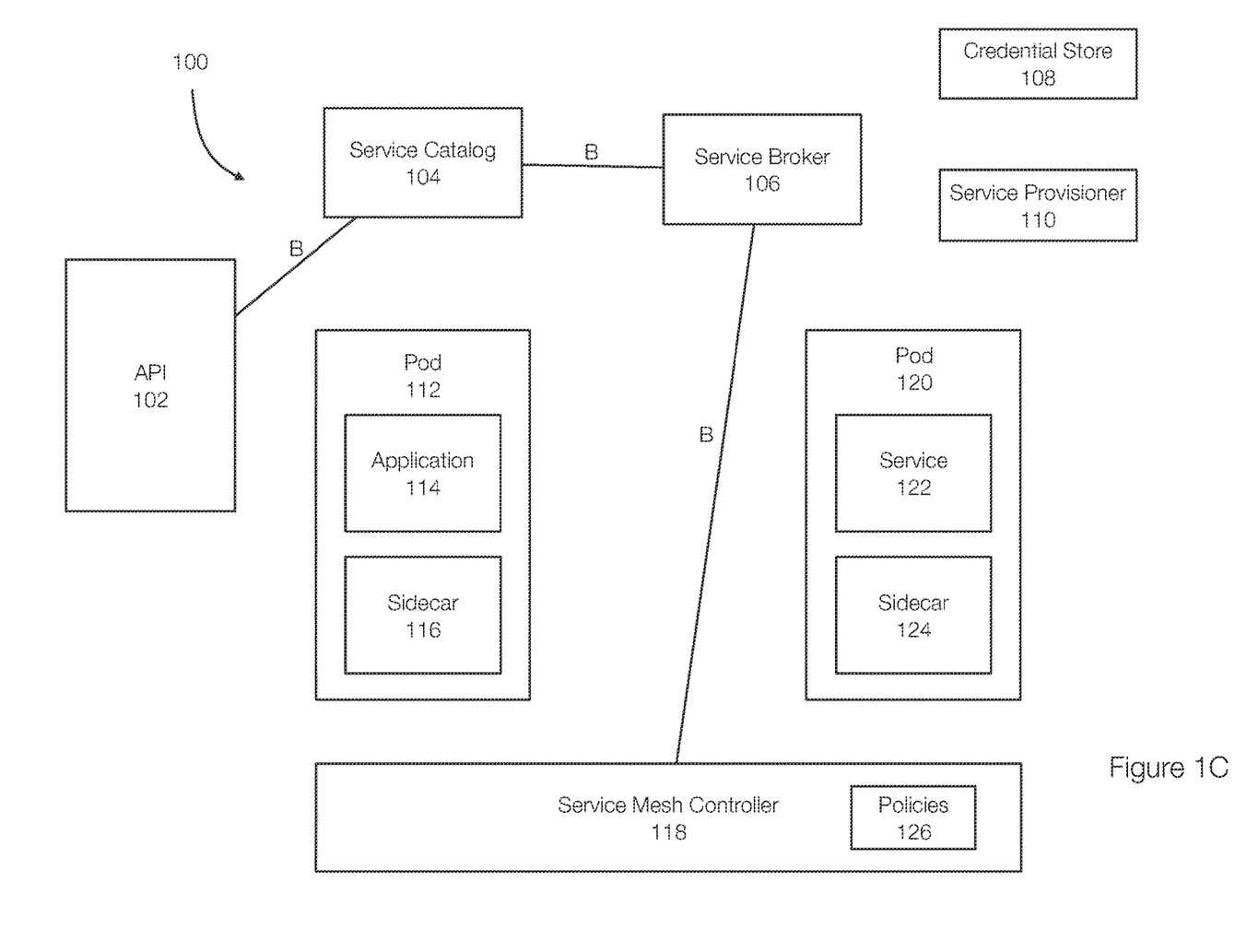
FIG. 1C discloses aspects of binding an application in the environment of FIG. 1A.
Figure 2:
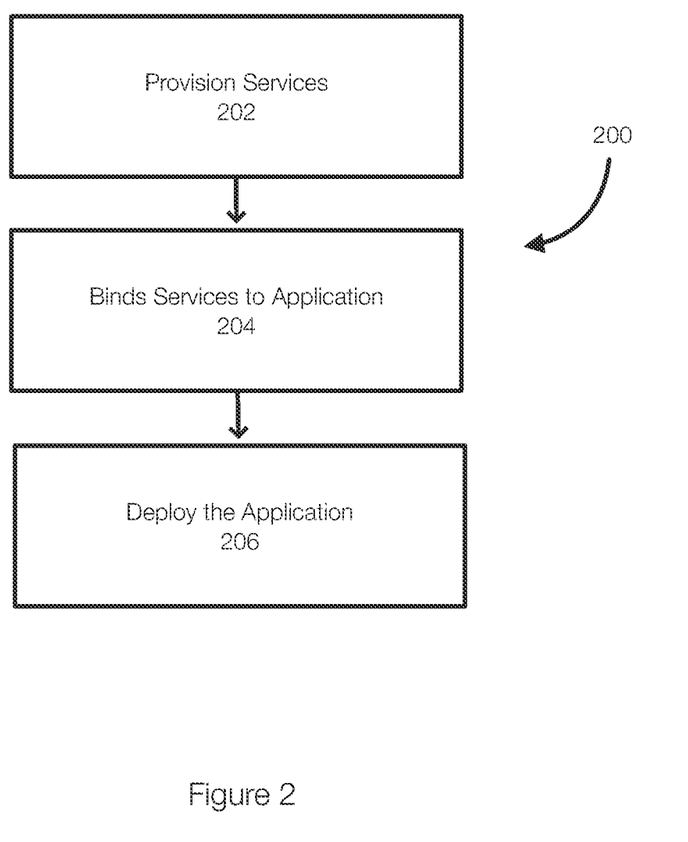
FIG. 2 discloses aspects of a provision workflow.

FIG. 2 discloses aspects of a provisioning workflow that includes dynamic access control. Initially, services are provisioned 200 in the method 200 and FIG. 1B illustrates the provisioning workflow (labeled with a P) in a computing environment. Initially, a request may be sent to API 102 to provision a service 122. Provisioning a service 202 may include browsing the service catalog 104 and issuing a request for a service. The service catalog 104 may forward the request to a service broker 106, which sends the request to a service provisioner 110. The service provisioner 110 automatically spawns a new service instance (service 122) in a pod 120 with a customized sidecar 124. The sidecar 124 may be injected by the service mesh controller 118. The sidecar 124 is available on the service mesh 128 operating in the platform 100. The service provisioner 110 then stores credentials in the credential store 108. These credentials or other secrets are not stored or maintained by the application 114.

Once the service 122 is provisioned, the application 114 is bound 204 to the service 122. Binding is illustrated with a B in the corresponding path in FIG. 1C. Initially, a developer may send a request to bind the provisioned service 122 to the application 114. The bind request is forwarded, by the service catalog 104, to the service broker 106. The service broker 106 stores the binding information. The service broker 106 then connects with the service mesh controller 118 to add a policy to the policies 126 that that only the application 114 is allowed to visit the provisioned service 122. Details regarding the communication may also be stored by the service mesh controller 118.

Figure 1D:
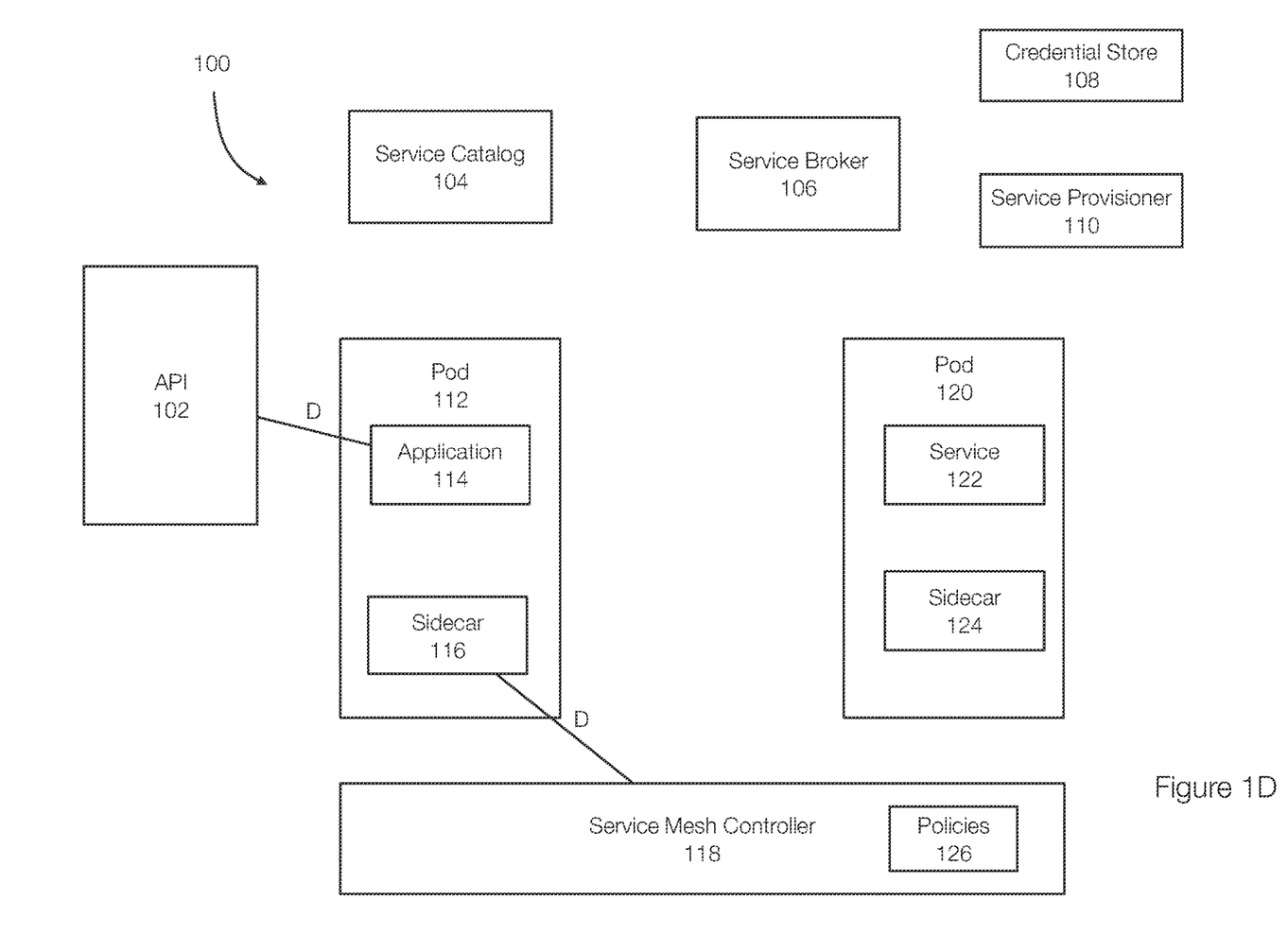
FIG. 1D discloses aspects of deploying an application in the environment of FIG. 1A.

Next, the application is deployed 206 as depicted using arrows labeled D in FIG. 1D. A request may be sent to the API 102 to deploy the application 114 to the pod 112. The sidecar 116 for the application 114 is deployed alongside the container application 114 by the service mesh controller 116 in the pod 1112. However, the service 122 is not configured in the application 114. In other words, the application 114 is not configured to store or handle the secrets needed to access and use the service 122.

Figure 3:
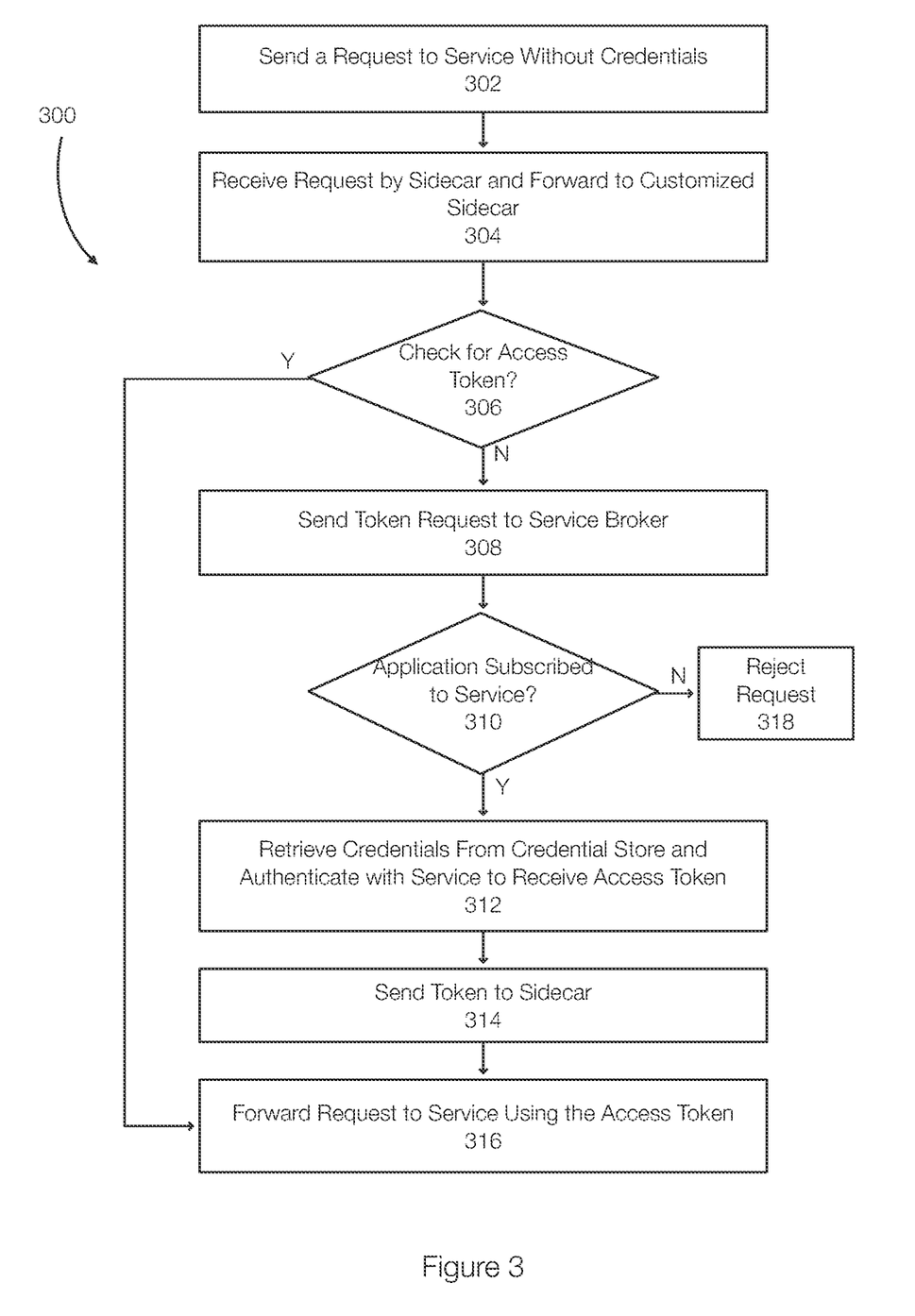
FIG. 3 discloses aspects of a runtime workflow for sending a request to a service.

FIG. 3 discloses aspects of a runtime workflow that provides dynamic access control using a service mesh. The operation is further disclosed with reference to FIG. 1E using an RT label on the path.

Figure 1E:
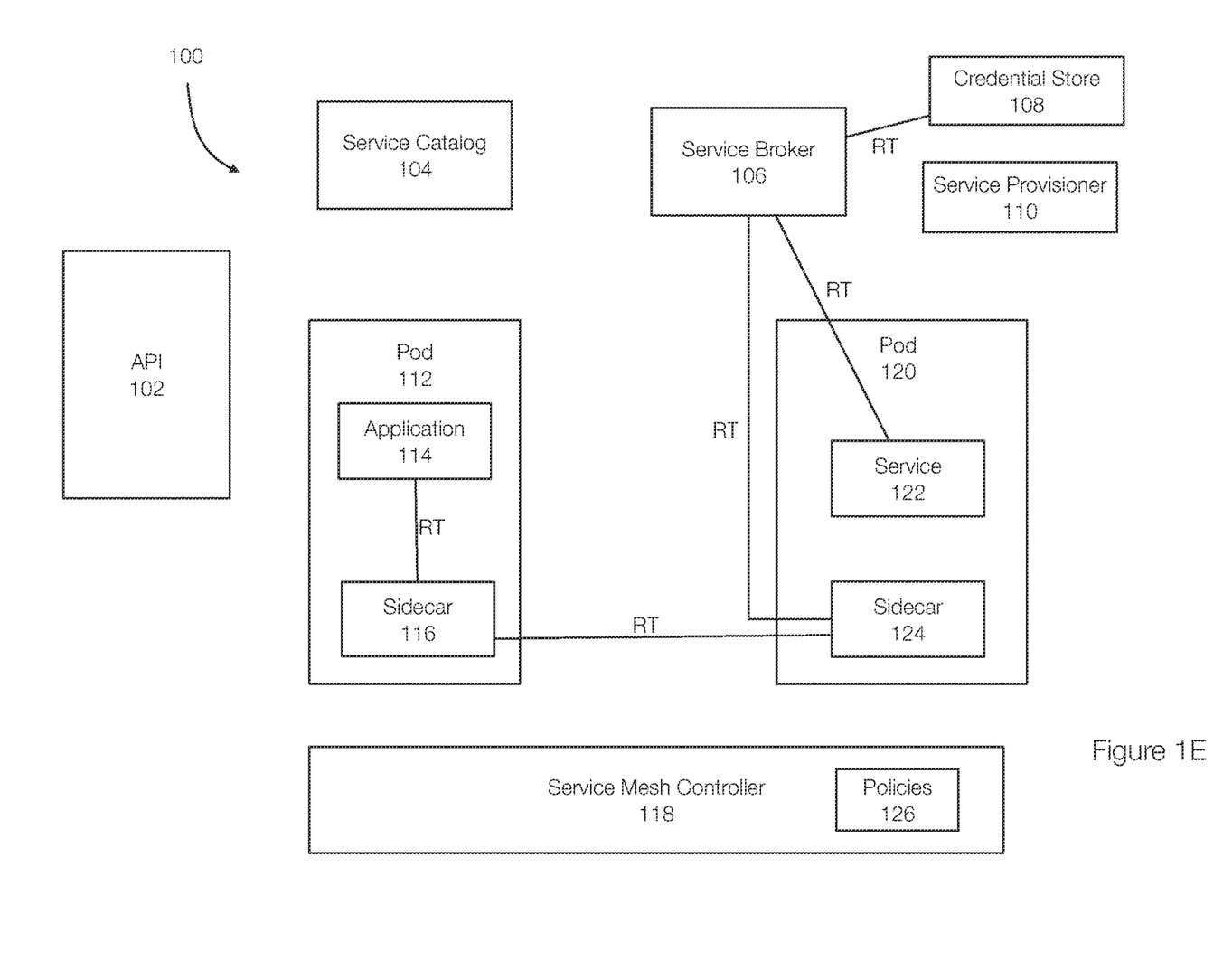
FIG. 1E discloses aspects of a runtime workflow for transmitting a request to a service without providing credentials by the application.

In this example, the application 114 may send 302 or generate a request for the service 122. In this example, the application 114 does not provide secrets or credentials. The application 114 may only need to specify the name of the service 122 (e.g., Mongo DB). This illustrates that the secrets are not stored by the application 114 and the secretes are not compromised if the application 114 is compromised.

The sidecar 116 may catch or intercept this request and forward 304 the request to the sidecar 124, which is customized in accordance with embodiments of the invention. Because the policies 126 allow the connection between the sidecar 114 and the sidecar 124, the sidecar 124 receives the request.

The sidecar 124 then checks 306 to determine whether an access token is available. If the access token is available (Y at 306), the request is forwarded 316 to the service using the access token (or other credentials). If the access token is not available (N at 306), a token request is sent 308 to the service broker 106. The service broker 106 determines whether the application 114 is subscribed 310 to the service 122. If the application is not subscribed (N at 310), the request is rejected.

If the application 114 is subscribed to the service 122 (Y at 310), the service broker 106 retrieves the credentials from the credential store 108 and authenticates 312 with the service 122 to receive an access token. The access token is then returned to or sent 314 to the sidecar 124. And the request originating from the application 114 is forwarded to the service 122 by the sidecar 124 using the access token from the service 122.

Thus, FIG. 3 (and FIGS. 1A-1E) illustrate a process of using or accessing a service without sending credentials and illustrates how various aspects of the environment 100 are configured to implement the method of FIG. 3. Thus, the sidecar 124, which is customized and deployed along with the service 122, can listen for all requests for the target service, translate the original application layer request, and establish a secure connection with the target service. The service mesh controller 118 is customized and configured to inject a sidecar 116 into the container with the application 114 and control network policies for services across the service mesh through the sidecar 116 and 124.

The service broker 106 is also customized. In addition to being able to request and provision a dedicated or third-party service, the service broker 106 is configured to provide an endpoint for authentication services for applications that have bond services. Thus, the application 114 is bound to the service 122. Using the service mesh 128, the service broker and the sidecar 124 can perform authentication. Advantageously, the application 114 does not require code to perform authentication operations, but only needs to identify the service in the request.

Figure 4:
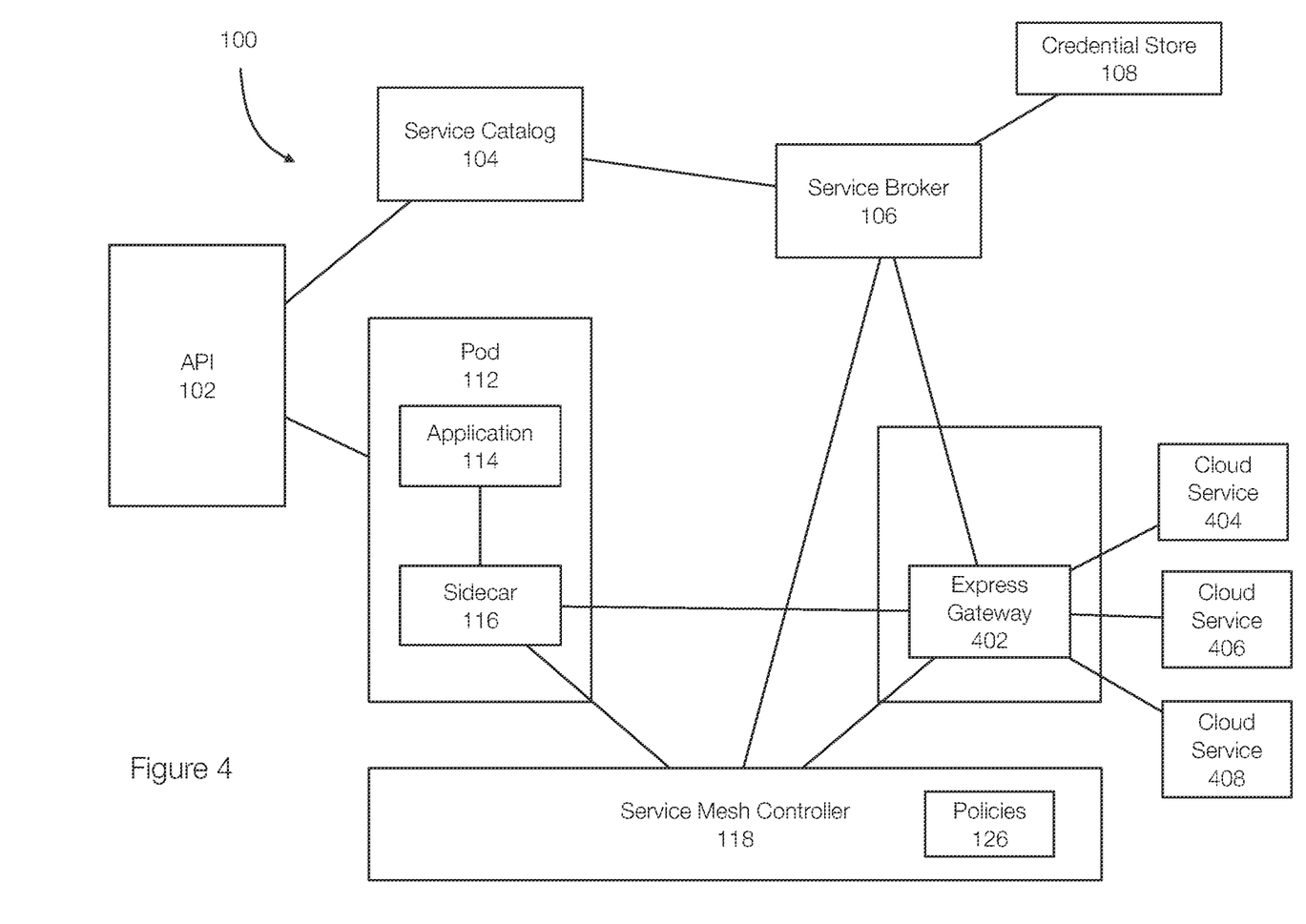
FIG. 4 discloses aspects of a computing environment that includes accessing cloud services without providing credentials and without specifying a cloud service or provider.

FIG. 4 discloses aspects of dynamic access control for cloud services. In FIG. 4, an application 114 may access a cloud service 404, 406, or 408. For example, the cloud services 404, 406 and 408 may be the same service type, but provided by different providers. In this example, provisioning and binding processed may be performed to bind an application to a service.

Figure 5:
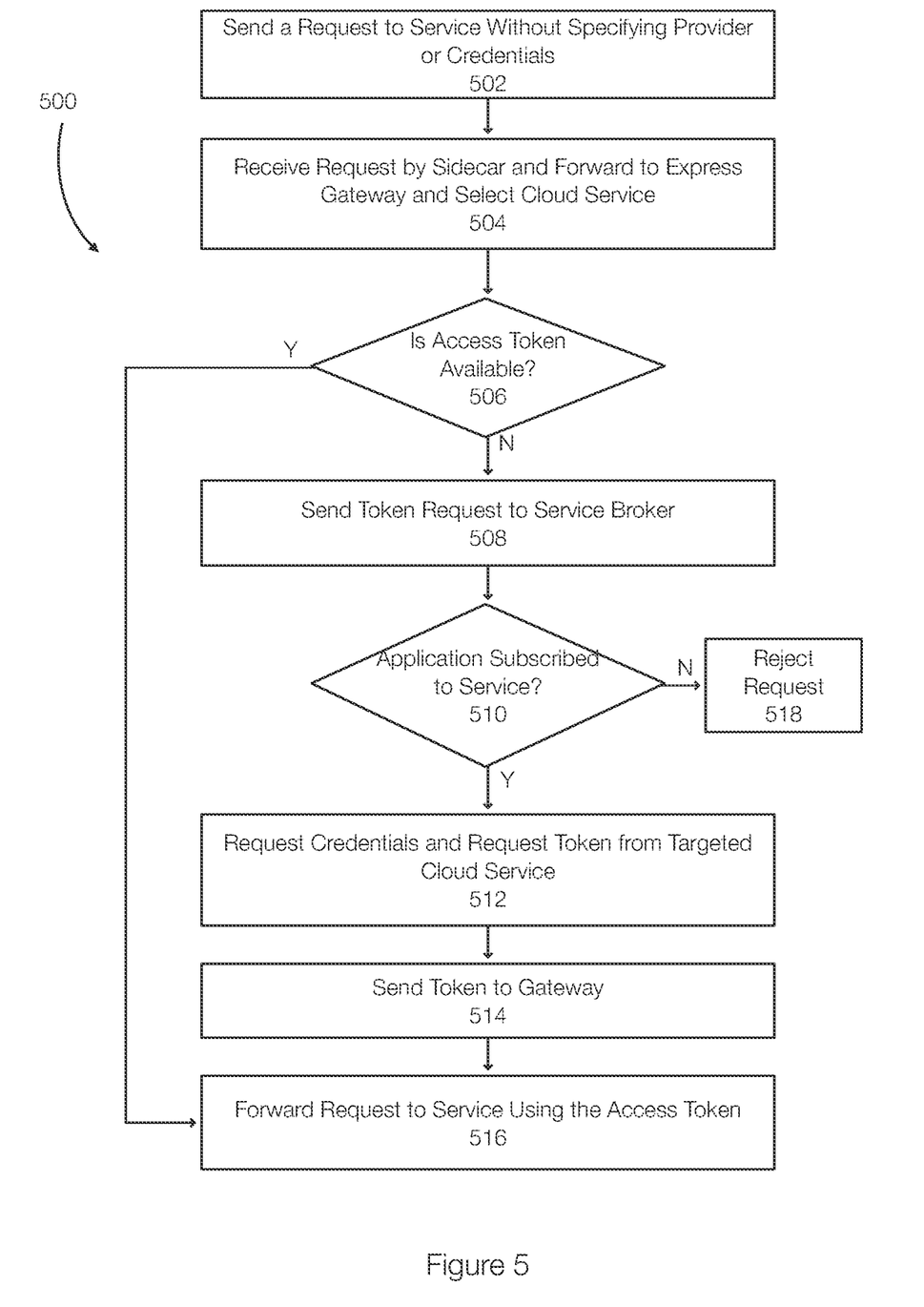
FIG. 5 discloses aspects of a runtime environment for sending a request to a cloud service or provider.

FIG. 5 discloses aspects of dynamic access control for cloud services and is described with respect to FIG. 4. In the method 500, a request is sent 502 for a service (e.g., a service of optical character recognition for an image) without specifying the cloud provider and without specifying credentials for the cloud provider. The application 114 accesses the service by only providing the service name corresponding to the name of the third-party service in the service broker 106.

The request is received 504 by the sidecar and forwarded to the express gateway 402 using the service mesh 128 (see FIG. 1A). In one example, policies 126 set by the service broker 106 allow this type of traffic. As a result, the express gateway 402 receives the request and applies any predefined policies or trained machine learning models to decide which of the cloud services 404, 406, and 408 to use. The machine learning model or policy may allow the cloud service 404, 406, or 408 to be selected on a basis of performance, cost, or the like. In either case, a cloud service is selected. In this example, the cloud service 406 is selected for example only.

The express gateway 402 may check 506 to determine if an access token is available. If an access token is not available, a token request is sent 508 to the service broker 106. The service broker 106 determines whether the application 114 has subscribed 510 to the requested service. The request for an access token is rejected 518 if the application 114 is not subscribed or bound to the service 406. If the application 114 has subscribed to the service 406, the service broker 106 requests credentials from the credential store 108 and requests 512 a token from the targeted cloud service (cloud service 406 in this example).

The service broker 106 forwards 514 the token to the express gateway 402. If the token is valid, the original request may be translated to a request that can be received by the selected cloud service 406 and the request 516 is sent to the service with the access token. If no access token is received, the request from the application is dropped.

In the foregoing examples, when an access token is obtained by the sidecar 124 or the express gateway 402, the access can be stored by the sidecar 124 or the express gateway 402. Requests that may need the stored access token can be identified based on the TLS protocol, which allows the requesting application and requested service to be identified. Once identified, the access token, if already present, may be used at least until it expires. Alternatively, the access token can be provided to the application and included in future requests until it expires or for other reason.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, containers or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect to the example method of Figure(s) XX that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: sending a request, by an application, to a service without sending secrets needed to access the service, receiving the request at a first sidecar associated with the service, determining whether the application has an access token and whether the application is subscribed to the service, retrieving the secrets from a credential store when the application is subscribed to the service, providing the access token to the first sidecar, and forwarding the request, by the first sidecar, to the application with the access token.

Embodiment 2. The method of embodiment 1, further comprising receiving the request at a second sidecar associated with the application.

Embodiment 3. The method of embodiment 1 and/or 2, further comprising forwarding the request, by the second sidecar, to the first sidecar associated with the service according to a policy in a service mesh.

Embodiment 4. The method of embodiment 1, 2 and/or 3, further comprising sending a token request, by the first sidecar, to a service broker.

Embodiment 5. The method of embodiment 1, 2, 3, and/or 4, further comprising authenticating with the service, by the first sidecar, to receive the access token from the service.

Embodiment 6. The method of embodiment 1, 2, 3, 4, and/or 5, further comprising determining, by the first sidecar, whether the application is allowed to communicate with the service based on policies of a service mesh.

Embodiment 7. The method of embodiment 1, 2, 3, 4, 5, and/or 6, further comprising provisioning the service, wherein provisioning the service includes binding the application to the service and obtaining credentials, wherein the credentials are stored in the credential store, which is separate from a user space of the application.

Embodiment 6. A method comprising: provisioning a service in a computing environment that includes a service mesh, storing credentials to access the service in a credential store, binding the service to an application in the service mesh, deploying the application to the computing environment, wherein a first sidecar is associated to the application and a second side car is associated to the service, sending a request to the service using the service mesh without including the credentials, when an access token in not available, obtaining, by a service broker, the access token using the credentials stored in the credential store and providing the access token to the second sidecar, and forwarding the request to the service by the second sidecar along with the access token.

Embodiment 7. The method of embodiment 6, wherein the request for the service is received by the first sidecar and transmitted to the second sidecar in accordance with policies of the service mesh, further comprising sending a token request to the service broker.

Embodiment 8. The method of embodiment 6 and/or 7, further sending the request, from the application, by specifying a name of the service.

Embodiment 9. The method of embodiment 6, 7, and/or 8, wherein the application is isolated from the credential store and is not configured to directly access the service other than generate the request.

Embodiment 10. The method of embodiment 6, 7, 8, and/or 9, wherein the second sidecar is configured differently from the first sidecar and is configured to obtain the access token, wherein the service broker is further configured as an endpoint for authentication.

Embodiment 11. A method for performing any of the operations, methods, or processes, or any portion of any of these, disclosed herein or in embodiments 1-10.

Embodiment 12 A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM) or container, that VM or container may constitute a virtualization of any combination of the physical components disclosed herein.

In the example, the physical computing device includes a memory which may include one, some, or all, of random-access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid-state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   provisioning a service in a computing environment that includes a service mesh;
   storing credentials to access the service in a credential store;
   binding the service to an application in the service mesh;
   connecting a service broker and a service mesh controller to add policies to the service mesh, wherein the policies of the service mesh are defined and maintained by the service mesh controller;
   deploying the application to the computing environment, wherein a first sidecar is associated to the application and a second side car is associated to the service;
   sending a request to the service using the service mesh without including the credentials, wherein the request for the service is received by the first sidecar and transmitted to the second sidecar in accordance with the policies of the service mesh;
   when an access token in not available, obtaining, by the service broker, the access token using the credentials stored in the credential store and providing the access token to the second sidecar; and
   forwarding the request to the service by the second sidecar along with the access token.

2. The method of claim 1, further comprising sending an token request to the service broker.

3. The method of claim 1, further sending the request, from the application, by specifying a name of the service.

4. The method of claim 1, wherein the application is isolated from the credential store and is not configured to directly access the service other than generate the request.

5. The method of claim 1, wherein the second sidecar is configured differently from the first sidecar and is configured to obtain the access token, wherein the service broker is further configured as an endpoint for authentication.

6. A non-transitory storage medium having stored therein instructions that are executable by one or more hardware processors to perform operations of claim 1.

* * * * *